United States Patent
Zuffetti

[11] Patent Number: 5,803,653
[45] Date of Patent: Sep. 8, 1998

[54] TELESCOPIC MOUNT FOR TEMPORARY WALLS

[76] Inventor: Gianfranco Zuffetti, 2, Via Vespucci, I-26027 Rivolta d'Adda Cremona, Italy

[21] Appl. No.: 779,743

[22] Filed: Jan. 7, 1997

[30] Foreign Application Priority Data

Feb. 2, 1996 [IT] Italy ............................... AR960004 U

[51] Int. Cl.$^6$ ..................................................... F16B 7/10
[52] U.S. Cl. ........................... 403/363; 403/335; 403/377; 52/645; 248/188.5
[58] Field of Search ..................................... 403/363, 335, 403/336, 377, 380, 309–311; 52/645, 731.5, 731.9, 733.2; 248/157, 161, 188.5

[56] References Cited

U.S. PATENT DOCUMENTS

| | | | |
|---|---|---|---|
| 3,204,382 | 9/1965 | McGurn | 52/645 X |
| 3,727,357 | 4/1973 | Stillman, Jr. | 256/DIG. 5 X |
| 3,823,523 | 7/1974 | Wells | 52/645 X |
| 3,900,269 | 8/1975 | Pavlot | 403/363 X |
| 3,933,222 | 1/1976 | Craig, Jr. | 403/363 X |
| 4,619,098 | 10/1986 | Taylor | 52/731.5 X |
| 5,464,302 | 11/1995 | Menchetti | 52/731.5 X |

FOREIGN PATENT DOCUMENTS

| | | | |
|---|---|---|---|
| 1320196 | 1/1963 | France | 403/363 |
| 2109117 | 9/1972 | Germany | 403/363 |
| 2855604 | 4/1980 | Germany | 52/731.9 |

*Primary Examiner*—Harry C. Kim
*Attorney, Agent, or Firm*—Young & Thompson

[57] ABSTRACT

A telescoping wall mount includes two long structural bars (1) and (6) having specific lengths and that are coupled together telescopically. The first bar (1) has a cross section similar to an open rectangle with wings (4) on the open side, each wing terminating with a U-shaped inwardly bent edge (5). The second structural bar (6) is made to be housed and to run inside the first bar. The second bar (6) has a cross section similar to an open rectangle with the wings (7) housed inside the U-shaped edges (5) of the first structural bar and sized so as to avoid transversal slack.

5 Claims, 1 Drawing Sheet

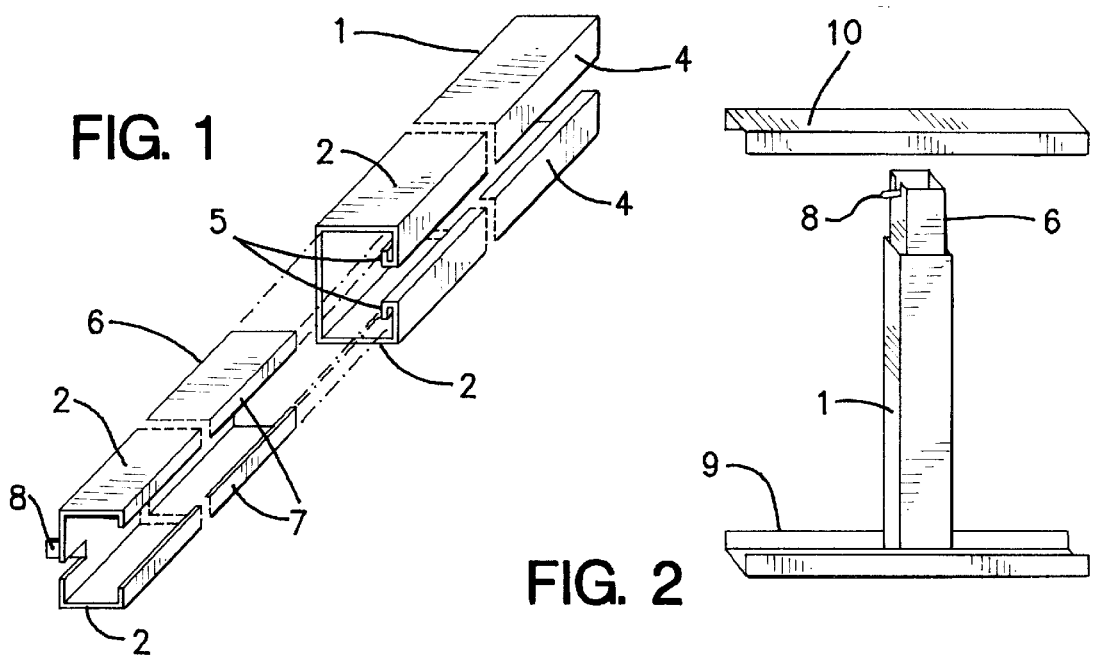
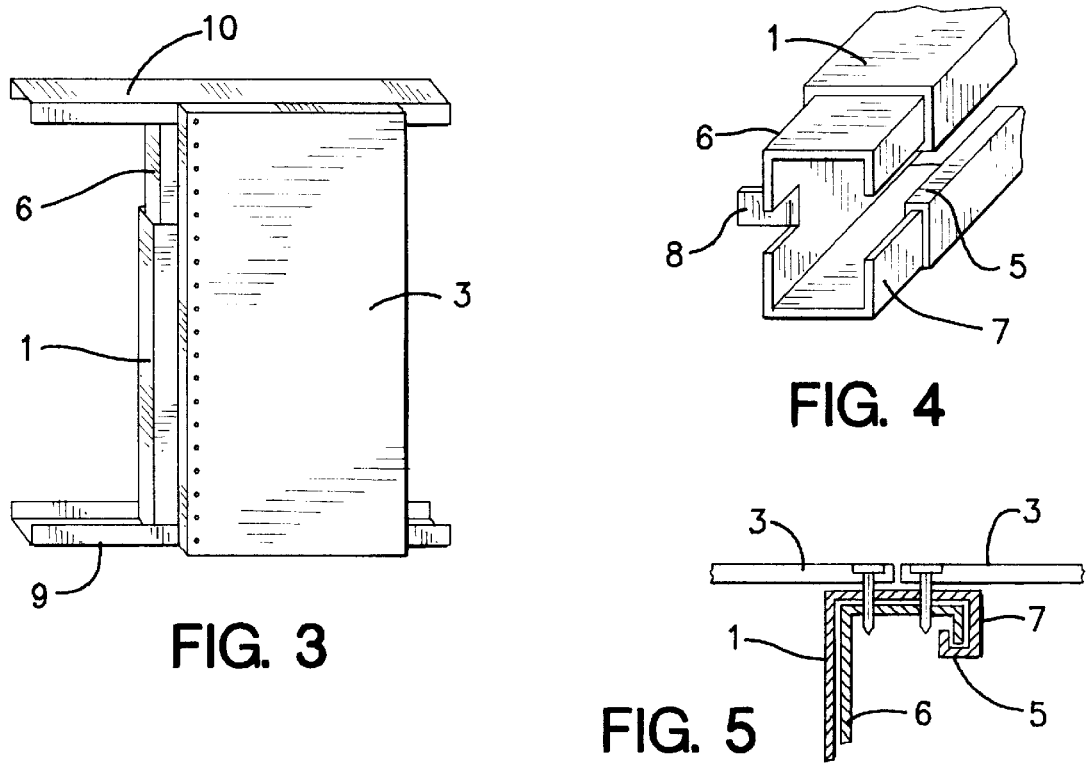
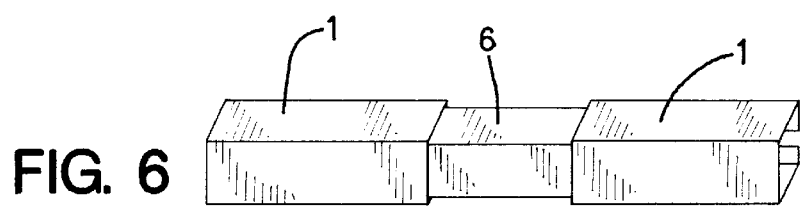

TELESCOPIC MOUNT FOR TEMPORARY WALLS

DESCRIPTION OF THE INVENTION

1. Field of the Invention

The invention consists in a telescopic mount formed by the combination of sheet metal structural bars; it is aimed at the creation of temporary wall structures, closed by light panels such as plasterboard.

2. Description of the Related Art

In the construction of temporary separating walls, two U-shaped sheet metal channels are used, of which one is anchored on the floor and the other one, counterposed to the first, is attached to the ceiling.

These channels, positioned as above, are joined by sheet metal mounts to which light closing panels are fixed one next to the other by means of self-threading screws, so as to create two surfaces separated by a hollow space.

Of the known mounts, to which the panels are anchored, one has a monolithic structure, with a cross section profile that is normally an open square, the other used in the longer structures is obtained by the combination of the two sheet metal structural bars that create a box type composite structural bar, each with an irregular open square cross section profile, i.e. the two facing sides having a different depth so as to allow a snap joining.

The known mounts of the first type present some disadvantages such as:

- their length must be greater or equal to that of the mount that must be made, creating difficulties in transport, first in the location where they will be used, then to the floor on which they will be installed;
- each one must be cut to the required length because, due to the irregularities of floors and ceilings, they may vary one from the other, even those used for the construction of the same wall;
- waste is therefore produced and must be transported to the local dump or to the building company's premises;
- the cutting of the mounts is normally carried out on site, using low precision mobile machinery, often resulting in irregular or low quality work;
- when the wall must be removed to be eliminated or repositioned, the mounts are generally not reusable except for walls of the same height or lower.

The known mounts of the second type, those with a box structure, can be built of different lengths starting off with the same components, but once they have been snap-coupled, their length cannot be changed, i.e. the components cannot run through each other. Therefore, the coupling requires a precision that is difficult to be reached by a single operator; finally, the application of the screws that hold the wall panels, is difficult because the internal wings of the box structure tend to bend inwards when the screws press to perforate them causing the torsion of the same composite structural bars and therefore the consequent irregular adherence to the applied panels, originating in uneven surfaces, normally undulated and therefore of low quality.

SUMMARY OF THE INVENTION

The aim of the present invention is to create a mount of sheet metal structural bars, shaped and structured so as to eliminate the disadvantages of the previously existing techniques, that is structured in such a way as to allow the installer to transport it and place it easily, even in the presence of variations, from one point to the other, in the height of the ceiling relative to the floor, without giving rise to waste and requiring cutting. Another aim is that the mount be particularly resistant and, when it is stressed by screws for fixing the wall panels, it will not be deformed so that the finished surface made with the panels is flat and well made.

These results are obtained with the mount that is the object of the present invention and which is realized through the combination of two long structural bars coupled telescopically to each other, able to run in a guided manner one inside the other, of which the first has a cross section profile similar to an open rectangle with the flanges of the open side each terminating with a bent edge to act as a guide and normally being U-shaped. The second structural bar, which is housed and runs inside the first, is also characterized by a cross section profile manner similar to an open rectangle with the flanges of the open side suitable for being housed and for running inside the U-shaped edges of the first structural bar, which are sized so as to impede transversal slack. Another specific characteristic of the mount is the presence of at least one flange on the second structural bar through which longitudinal forces can be applied to make it slide in respect to the first structural bar.

This composite structural bar therefore allows the execution of mounts whose lengths can be precisely regulated, without any cutting. The sheet metal of the sides where the bars are superimposed, is fixed so that the reciprocal inflections are impeded even when they are stressed by screws, so that the mount does not bend or warp along its length and so that the applied panels, as well as adhering to the mounts, give rise to flat non undulated surfaces. Moreover, the mounts built this way, can be recycled for other installations of different heights (higher or lower) when the wall is removed. Finally, when the said mounts are coupled and in their minimum length state they can easily be transported on road or inside normal elevators in buildings where the temporary walls are to be installed.

BRIEF DESCRIPTION OF THE DRAWINGS

The invention in its structure and shape will appear evident with the help of the following description referred to the preferable form for the making of the same, illustrated only as an example in the figures of the enclosed design in which:

FIG. 1 is the axonometric view of the two structural bars, detached but aligned between each other in the joining position;

FIG. 2 is the axonometric view of the said mount placed for application between two counterposed channels;

FIG. 3 is the axonometric view of the mount that connects two channels, shown partially covered by a wall panel;

FIG. 4 is the axonometric view in a different scale of a portion of the mount in its minimum length state, which shows the joining between the two bars and the operating flange at the free end of the internal one;

FIG. 5 exemplifies with an axial view the coupling of the mount to the closing panels, by means of self-threading screws;

FIG. 6 is the axonometric view of one mount made with an alternated succession of structural bars coupled telescopically between each other.

It is understood that the enclosed drawings simply illustrate the object of the invention without limiting it in regards to proportions, surfaces, position of the operating flange.

DETAILED DESCRIPTION OF THE PREFERRED EMBODIMENTS

In the drawings, 1 indicates the first structural bar, 2 indicates the counterposed surfaces to which the wall panels 3 adhere, 4 indicates the wings of the open side, 5 indicates the U-shaped edges, 6 is the second structural bar, 7 is the wings of its open side, and 8 indicates the operating flange, 9 and 10 are the grooves between which the above mount is placed.

The invention actually consists in a long structural steel unit whose length can be precisely adjusted after its assembly, by sliding its components. The structure includes a combination of structural bars coupled together telescopically, the first of which has a cross section similar to an open rectangle with two parallel surfaces with wings 4 that each terminate with an inwardly bent U-shaped edge. The second structural bar 6 also has a cross section similar to a rectangle and it is sized so that its wings 7 fit perfectly within the U-shaped edges 5 of the first structural bar 1 and also to avoid any transversal slack between the two coupled structural bars, so that the first one acts as a guide to the second one. The second structural bar 6 is also equipped with gripping points through which it is pushed to slide within the first one. The two structural bars and 6 have a cross sectional shape that may vary. However, they have two facing parallel surfaces 2, on which the closing panels 3 have to be anchored, and wings 4 and 7 shaped to be reciprocally coupled together.

The length of the structural bar 1, that is the external bar, is less than the minimum height of the rooms where the temporary walls are to be mounted.

Its length is usually slightly above or just above two meters, this is to simplify its transportation to the working site and on the floor where it will be used, and also to obtain the overlap of the steel sheets of the coupled structural bars in the point in which the highest mechanical stress of the mount is calculated to be.

On the basis of the mechanical stress they are calculated to undergo when mounted, the coupled structural bars 1 and 6 can both have smooth surfaces or only the external bar 1 or only the internal bar 6 can have smooth surfaces or both the structural bars will have ribbed surfaces to obtain a higher mechanical resistance to inflection.

Relative sliding of the coupled structural bars 1 and 6 is facilitated by at least one gripping point on structural bar 6 normally shaped as a projecting flange 8, on which to apply the forces that make structure bar 6 slide in respect to the external structural bar 1.

The position of this projecting flange 8, towards the free end of the internal structural bar 6, appears advantageous as exemplified in FIGS. 1, 2 and 4.

The above-mentioned composite mount is structured in its components so that, should it be necessary to reach a height that is superior to the one that can be reached by using the two structural bars (1) and (6), it can be combined with a plurality of type 1 and 6 structural bars, arranged in a cascade connection alternately, until they reach a maximum length of the composite telescopic mount that is superior or equal to that required.

The enclosed drawings exemplify the invention which, in production, may undergo further adjustments that can improve industrial production, without modifying the innovative concept described as the basis of the invention.

I claim:

1. A telescoping mount for a wall, comprising:

a first structural bar having two opposing parallel surfaces of sheet metal constructed to mount a panel, said two parallel surfaces being joined at one side by a sheet metal surface and at the other side by a sheet metal surface with a lengthwise first opening, said first opening having edges that each fold inwardly to form a U-shape that is open toward a respective one of said two parallel surfaces of said first bar;

a second structural bar sized to fit within said first bar and having two opposing parallel surfaces of sheet metal constructed to mount the panel, said two parallel surfaces of said second bar being joined at one side by a sheet metal surface and at the other side by a sheet metal surface with a lengthwise second opening, said second opening having edges that extend towards each other across said second opening, said edges of said second bar being of a length so that said two parallel surfaces of said second bar are urged against corresponding ones of said two parallel surfaces of said first bar when said second bar is inserted into said first bar with said edges of said second opening inserted into and urged against a bottom of said U-shape edges of said first opening; and a gripping member extended outwardly from one of said first and second bars for moving said one bar relative to the other of said bars.

2. The mount of claim 1, wherein said first bar has a length of at least two meters.

3. The mount of claim 1, wherein said gripping member comprises a portion of said one side of sheet metal of said second bar that is bent outwardly from a flat surface of said one side of said second bar.

4. The mount of claim 1, further comprising a third structural bar that is the same as said first bar, wherein a first end of said second bar is inserted into said first bar and a second end of said second bar is inserted into said third bar.

5. The mount of claim 1, wherein said first opening has a width that is less than one half a width of said other side of said first bar.

* * * * *